United States Patent [19]

Omuro

[11] Patent Number: 5,144,420
[45] Date of Patent: Sep. 1, 1992

[54] COLOR IMAGE PROCESSING APPARATUS THAT MULTIPLIES COLOR DIFFERENCE SIGNALS BY GENERATED COEFFICIENTS TO ACHIEVE SATURATION CONTROL WITHOUT CHANGING COLOR PHASE

[75] Inventor: Hideaki Omuro, Tokyo, Japan

[73] Assignee: Sony Corporation, Tokyo, Japan

[21] Appl. No.: 565,245

[22] Filed: Aug. 10, 1990

[30] Foreign Application Priority Data

Aug. 15, 1989 [JP]  Japan .................................. 1-209655

[51] Int. Cl.⁵ .............................................. G03F 3/08
[52] U.S. Cl. ........................................ 358/80; 358/27; 358/29
[58] Field of Search .................. 358/75, 80, 27, 28, 358/29, 35, 37

[56] References Cited

U.S. PATENT DOCUMENTS

| | | | |
|---|---|---|---|
| 4,647,963 | 3/1987 | Johnson et al. | 358/80 |
| 4,673,970 | 6/1987 | Matsumoto et al. | 358/27 |
| 4,712,132 | 12/1987 | Soca | 358/37 |
| 4,831,434 | 5/1989 | Fuchsberger | 358/80 |
| 4,887,150 | 12/1989 | Chiba et al. | 358/80 |

FOREIGN PATENT DOCUMENTS

| | | | |
|---|---|---|---|
| 0340033 | 11/1989 | European Pat. Off. | |
| 60-188 | 1/1985 | Japan | 358/27 |
| 0566408 | 7/1977 | U.S.S.R. | 358/27 |
| 2045026 | 10/1980 | United Kingdom | |

*Primary Examiner*—Leo H. Boudreau
*Assistant Examiner*—Andrew W. Johns
*Attorney, Agent, or Firm*—Lewis H. Eslinger; Donald S. Dowden

[57] ABSTRACT

Image processing apparatus with a color saturation controller for processing a color image signal to be printed derives color difference signals from an incoming color image signal, detects a minimum difference value between an allowable dynamic range of color difference signals and the derived color difference signals, and generates a coefficient value based on the detected minimum difference value. The levels of the derived color difference signals are corrected by multiplying the generated coefficient value and the color difference signals. The dynamic range of the input color difference signals is extended by such multiplication within a scope not causing any overflow, and the color saturation can be directly corrected without changing the color phase of the image signal.

6 Claims, 7 Drawing Sheets

COLOR IMAGE PROCESSING APPARATUS THAT MULTIPLIES COLOR DIFFERENCE SIGNALS BY GENERATED COEFFICIENTS TO ACHIEVE SATURATION CONTROL WITHOUT CHANGING COLOR PHASE

BACKGROUND OF THE INVENTION

1. Field of the Invention

The present invention relates to an image processing apparatus that processes an input image signal to generate a print signal and, more particularly, to such apparatus equipped with an automatic color saturation controller.

2. Description of the Prior Art

Technical development relative to a still print image processing system is currently in progress, wherein a video signal (still image signal) of one frame obtained from a video source such as a television camera, video disk, electronic still camera or the like is supplied to an image processor, which then processes the input image signal to generate a desired print signal. The print signal is supplied to a printing device to control the printing of the image.

Figure 9:
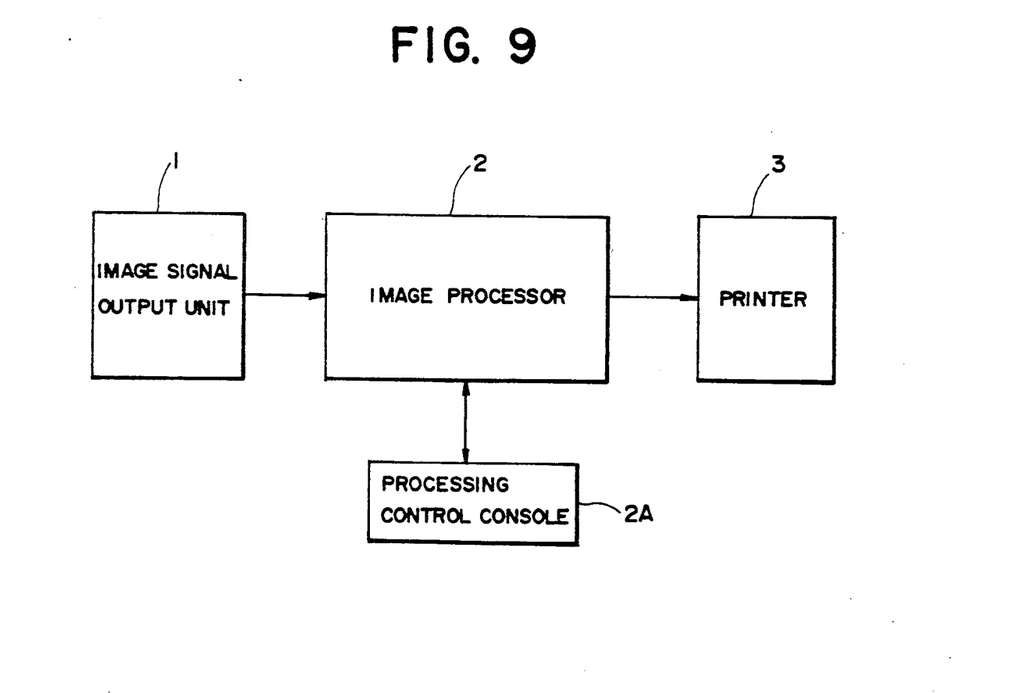
FIG. 9 is an exemplary diagram of an image processing system.

FIG. 9 is a block diagram of an exemplary image processing system, wherein reference numeral 1 denotes an image signal output unit for generating a video signal (still image) of one frame. The image signal output unit may comprise or respond to a television camera or the like. The still image signal derived therefrom is fed to an image processor 2 and then is processed in compliance with the signals generated by a processing control console 2A. The image processing executed with respect to the supplied original still image signal includes noise reduction, luminance control, color saturation control, image conversion (enlargement, reduction, rotation, image size change) and so forth. Such image processing is conventional per se and thus not described in detail herein. The processing control console 2A comprises input means such as a keyboard and a mouse and display means including a processing operation monitor, an image monitor and so forth.

A printer 3 is supplied with the output signal of the image processor 2 suitably converted to print signals of, e.g., four colors C, M, Y and K (cyan, magenta, yellow and black) after completion of the various image processings, whereby the operation of printing the color image is executed by the printer 3.

In the image processing system mentioned, there exists the problem that when the image signal obtained from a video camera or the like is fed into the image processor 2 via the image signal output unit 1 and then the image is processed by the image processor 2 while being displayed on a monitor television receiver or the like, the color saturation of the printed image is reduced as compared to the color saturation of the image displayed on the monitor television receiver.

If a proper color saturation is not obtained, the color saturation can be improved by individually controlling the three primary color signals R, G, B (red, green, blue) or C, M, Y (cyan, magenta, yellow) in the printer 3. In such a case, however, the color phase is changed simultaneously so that there is considerable difficulty, when employing individual color adjustment, in controlling the color saturation without disturbing the color phase.

OBJECTS AND SUMMARY OF THE INVENTION

An object of the present invention is to provide a remedy for the problems of the prior art mentioned above. In particular, an object of the invention is to provide an improved image processing apparatus having an automatic color saturation control function which, in an automatic processing mode, is capable of automatically and consistently printing an image having a proper color saturation.

For the purpose of achieving the objects of the invention, in an image processing apparatus constructed in accordance with the invention color difference digital data is detected from a still image signal of one frame. The still image signal is composed of a luminance signal and two color difference signals, and a coefficient is set to a proper value which is selected so as not to cause any overflow of the color difference data beyond an allowable dynamic range (00000000 to 11111111 in an 8-bit arrangement) when the coefficient is employed to multiply the color difference data. The color difference data relative to each pixel of one frame is multiplied by a real number corresponding to such coefficient value, whereby the dynamic range of the input color difference signals is extended.

As the color difference signals (R−Y) and B−Y) are multiplied by a real number corresponding to the set coefficient value, the color saturation can be easily, automatically and directly corrected without changing the color phase of the image signal.

In accordance with one aspect of the invention, there is provided image processing apparatus having a color saturation controller for processing a color image signal to be printed, the apparatus comprising: input means for providing an incoming color image signal; color difference means responsive to the input means for deriving color difference signals from the incoming color image signal; detecting means responsive to the color difference means for detecting a minimum difference value between an allowable dynamic range of color difference signals and the derived color difference signals; coefficient setting means responsive to the detecting means for generating a coefficient value based on the detected minimum difference value; and multiplying means responsive to the coefficient setting means for correcting the levels of the derived color difference signals by multiplying the generated coefficient value and the color difference signals.

Preferably, the image processing apparatus further comprises means for limiting the coefficient value obtained from the coefficient value generating means, as well as other features set out in the appended claims.

Setting the coefficient to a value that does not cause any overflow can be accomplished by the provision of a coefficient-calculating data detection means for detecting a minimum difference value (difference data) between the color difference data in each pixel and the upper limit value (e.g., 11111111) or the lower limit value (e.g., 00000000) of the dynamic range; and a coefficient setting means for calculating, on the basis of the detected minimum difference value, a proper coefficient value which is capable of reducing the minimum value (difference data) to zero by multiplying the color difference data.

Figure 1:
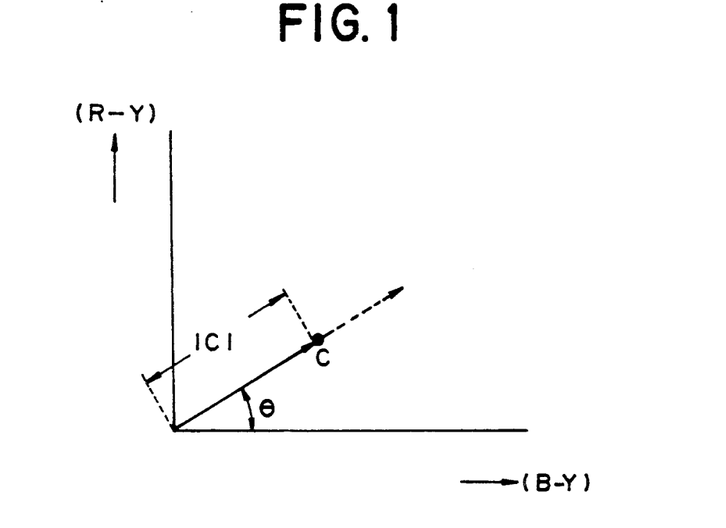
FIG. 1 is a graph representing color phase data and color saturation data.

In case the image signal is composed of a luminance signal Y and two color difference signals (R−Y) and (B−Y), the color phase or hue is represented, as graphically shown in FIG. 1, by an angle $\theta$ which is formed by the (B−Y) axis and a vector C of the relevant color in plane coordinates with (R−Y) and (B−Y) plotted as mutually orthogonal axes. Meanwhile the color saturation is represented by $|C|$, which corresponds to the magnitude of the vector C. Therefore, control of the color saturation alone can be achieved by multiplying $|C|$ and a real number, as indicated in FIG. 1 by a dotted line.

Consequently, the color saturation of the image signal can be improved by multiplying the color difference signals (R−Y), (B−Y) and the real number (coefficient value) in the processing means.

Furthermore, because of the use of the value obtained in the coefficient setting means, it becomes possible to avoid a partial loss of the signal due to an excess of the multiplied result beyond the allowable dynamic range.

The foregoing and other objects, features and advantages of the present invention will be apparent from the following detailed description of the preferred embodiments of the invention, which should be read in conjunction with the accompanying drawings.

DESCRIPTION OF THE PREFERRED EMBODIMENTS

Figure 2:
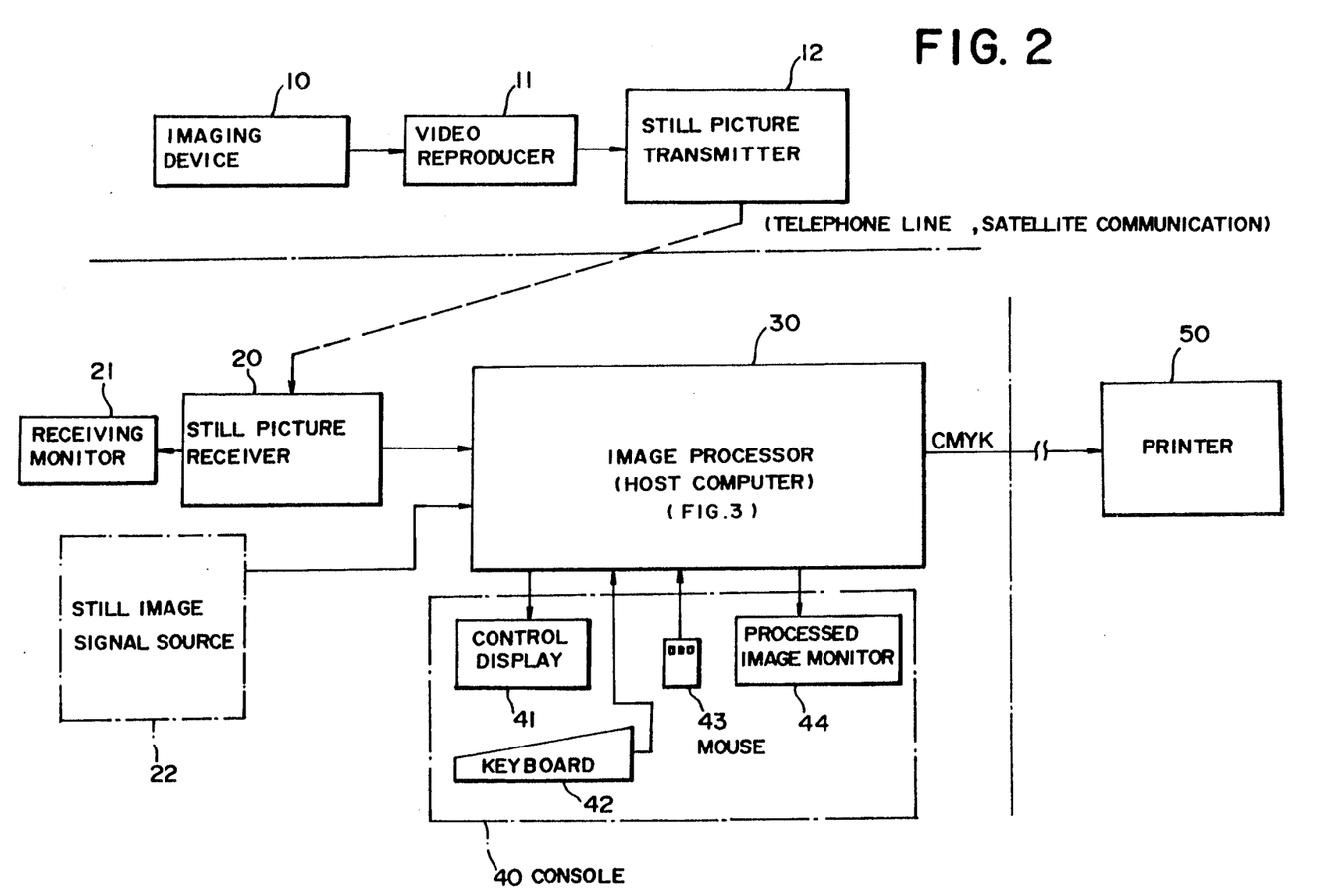
FIG. 2 is a block diagram of an image processing system equipped with image processing apparatus constructed in accordance with the present invention.

FIG. 2 is a block diagram of an exemplary image processing system equipped with image processing apparatus constructed in accordance with the present invention. This exemplary system is constructed so that an image signal transmitted in a suitable way can be processed and printed, for example, as a photograph in a newspaper. First a description will be given with regard to such image processing system.

FIG. 2 shows an imaging device 10 such as a television camera; a video reproducer 11 (TV monitor) for reproducing the video image picked up by the imaging device 10; and a still picture transmitter 12 capable of transmitting, via a telephone line, a communications satellite link or the like, a desired picture (color video signal of one frame) out of the entire picked-up video image.

A still picture receiver 20 receives the picture derived from the still picture transmitter 12, and a receiving monitor 21 displays the received picture. The still image signal received by the picture receiver 20 is composed of a luminance signal (Y signal) and two color difference signals ((R−Y), (B−Y) signals) of one frame, and is supplied sequentially to an image processor 30. A still image signal source such as a video disk unit, videotape recorder, television receiver or the like is provided as an alterative source of a still image signal input to the image processor 30.

As will be described in detail later, the image processor 30 is so constituted as to perform various operations on the image signal supplied thereto, such as storing the image signal, processing the image, and generating a suitable print signal.

A console 40 comprises a control display 41, a keyboard 42, a mouse 43 and a processed image monitor 44. This console 40 is manipulated by an operator to execute various operations of the image processor 30.

A printer 50 is supplied with the print image data that is processed by the image processor 30 and converted to print color signals of, e.g., C, M, Y and K (cyan, magenta, yellow and black) and then prints the desired image.

By virtue of the constitution of the system described above, an image obtained by picking up, for example, a news scene and phototelegraphed by the still picture transmitter 12 is immediately processed so that it is ready for printing. The image signal to be printed is then supplied directly to the printer. Thus, the apparatus is effectively utilizable under on-line control for an editing system or the like employed, for example, by a newspaper publishing company.

Figure 3:
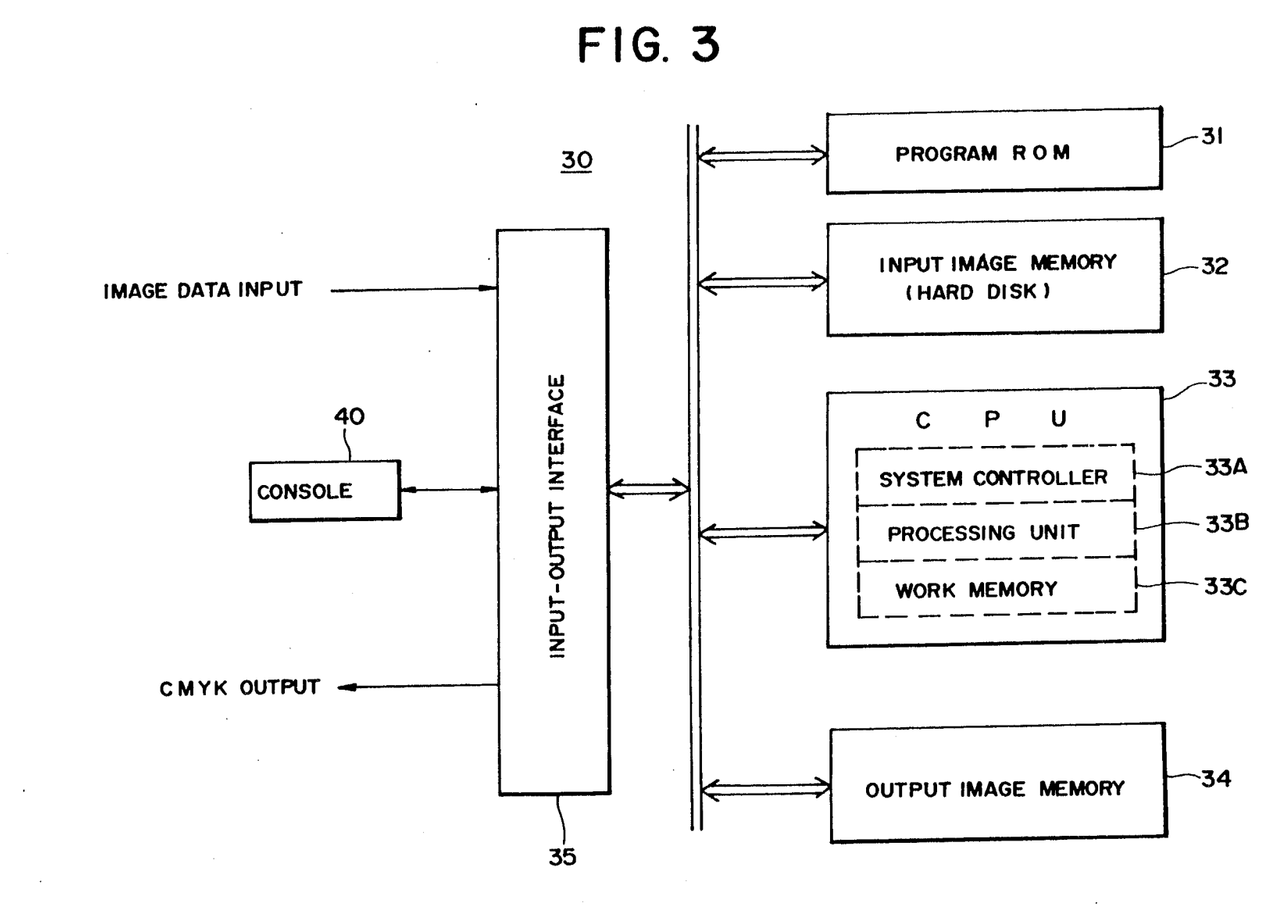
FIG. 3 is a block diagram showing the constitution of the image processing apparatus.

In the image processing system shown in FIG. 2, the image processor 30 embodying the present invention is constructed as illustrated in FIG. 3 and serves as a host computer to the entire system. That is, the image processor 30 comprises a program ROM 31 wherein various control programs are stored; an input image memory (hard disk) 32 wherein image data supplied from an image source such as the still picture receiver 20 is sequentially stored; a CPU (central processing unit) 33 serving as a controller; an output image memory 34 for storing an output image signal converted to individual color signals C, M, Y and K (cyan, magenta, yellow and black) after being processed for printing; and an input-output interface 35 for transferring the image data to or from the console 40. The CPU 33 comprises a system controller 33A for controlling the operations of the component elements in accordance with an operation program, a processing unit 33B for executing various processings, and a work memory (main storage memory) 33C.

Figure 4:
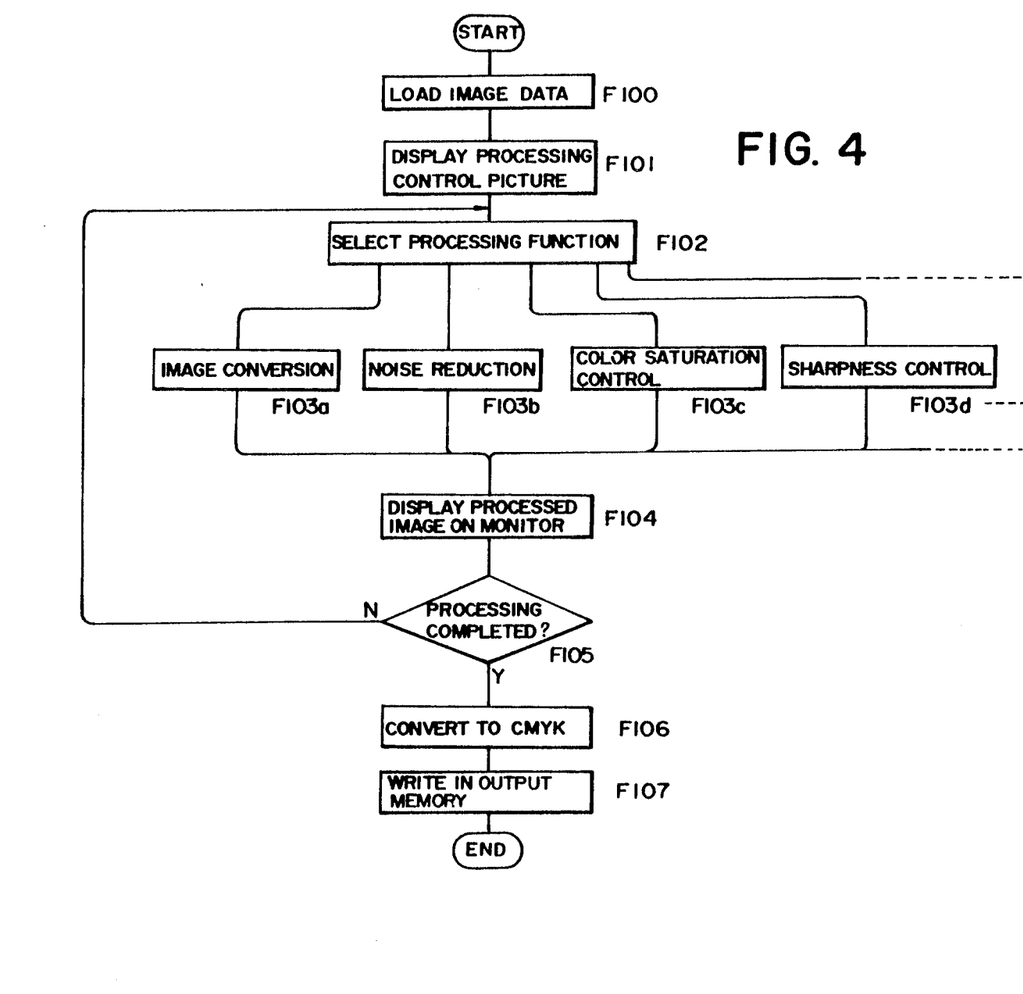
FIG. 4 is a flowchart showing exemplary operations performed in the image processing apparatus.

The still image signal supplied to such image processor 30 is sequentially stored in the input image memory (hard disk) 32. Then the image data is read out from the hard disk 32 in accordance with requirements, and the image processing routines as shown in a flowchart of FIG. 4 are executed principally by operations in the CPU 33.

In the image processing procedure, first the image data to be processed is loaded from the input image memory 32 into the CPU 33 [F100], and then the processing control picture representing the contents to be processed is displayed in the form, for example, of a menu on the control display 41 of the console 40 [F101].

The processing function is determined [F102] in response to an input from the operator via the keyboard 42 or the mouse 43, and then the determined processing routine is executed. More specifically, there is executed one function selected from the functions of image conversion, noise reduction, color saturation control, sharpness control and so forth. These functions are denoted by F103a, F103b, F103c, F103d..., respectively. As for the image conversion in F103a, any of enlargement/reduction, center position change, rotation, image size change and so forth can be executed with respect to the original image supplied as an input. Although the functions FI03a, FI03b, FI03c, F103d...are shown in parallel in the flowchart of FIG. 4, it is a matter of course that such functions may be executed sequentially in any order.

The image signal processed in F103 is supplied to the processed image monitor 44 (FIG. 2) and displayed [F104] so that the operator can check the current stage in the processing procedure. When another function is to be executed, the operator manipulates the keyboard 42 or mouse 43 of the console 40 to select the processing routine appropriate to the new function [F105→F102].

After completing all of the image processing operations, the image signal is converted to C, M, Y and K color signals adapted to be printed [F106], and then such signals are stored as output data in the output image memory 34 [F107]. Subsequently, the data thus stored is supplied to the printer 50 (FIG. 2) from the memory 34 (FIG. 3) either automatically or by manipulation of the console 40, whereby one full color image is printed with the image signals of four colors C, M, Y and K.

Image processing apparatus constructed in accordance with the invention is adapted to control the color saturation [F103c] automatically in a way that is novel and highly effective.

Figure 5:
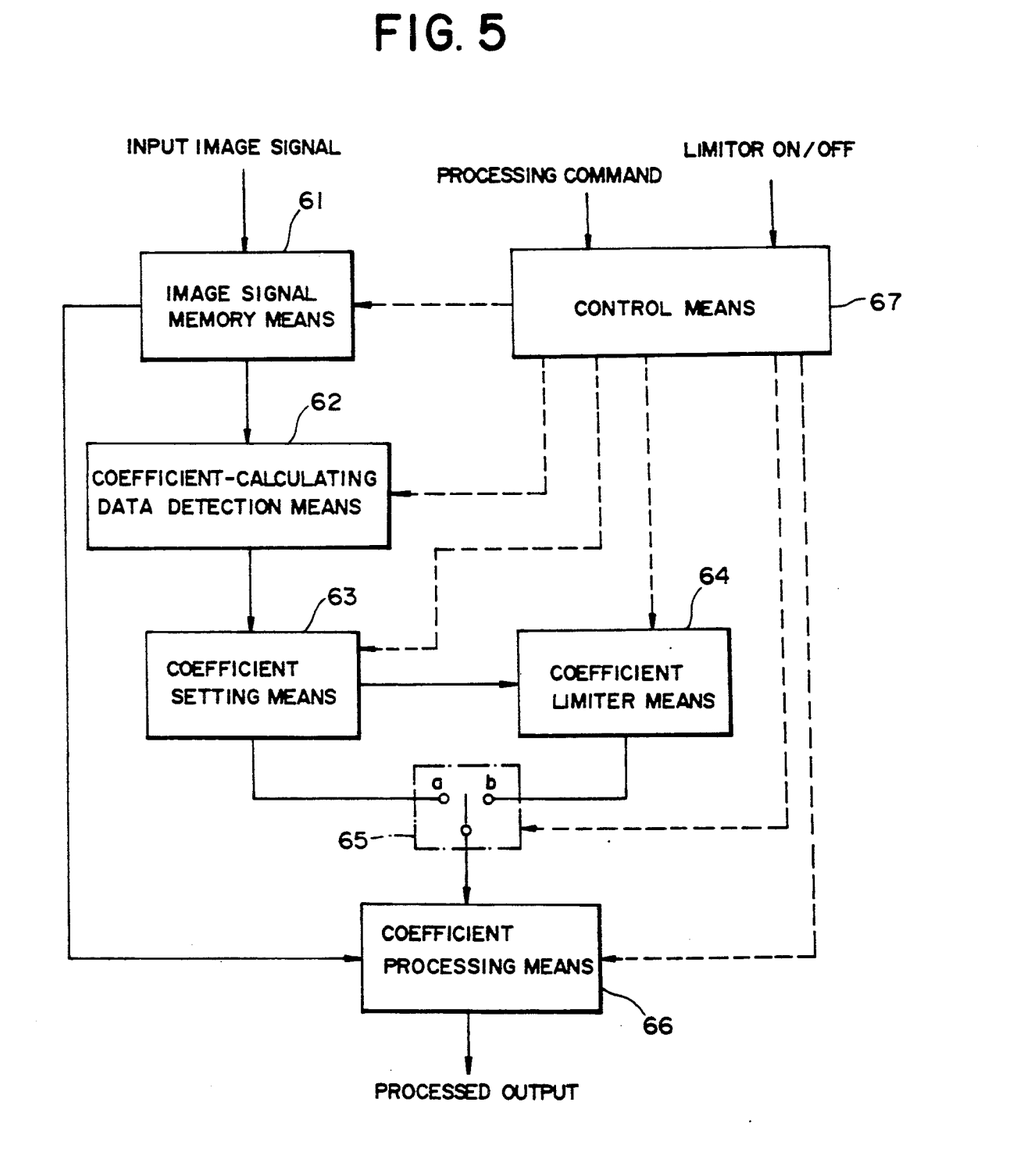
FIG. 5 is a function block diagram of a preferred embodiment of the present invention.

FIG. 5 is a function block diagram of means for realizing the color saturation control in the preferred embodiment of the invention. Such function blocks are preferably constituted by software in the CPU 33.

Image signal memory means 61 holds Y, (R−Y) and (B−Y) digital image signals (in this embodiment, 8-bit signals) of one frame read out from the hard disk 32 for processing. Coefficient-calculating data detection means 62 detects from the (R−Y) signal data and the (B−Y) signal data stored in the image signal memory means 61, a maximum color difference data value or a minimum color difference data value (within one frame of the image) which is the closest to the upper limit value (11111111) or the lower limit value (00000000) of the dynamic range, and then supplies coefficient calculating data based on the difference between the detected value and the upper or lower limit value.

Figure 6:
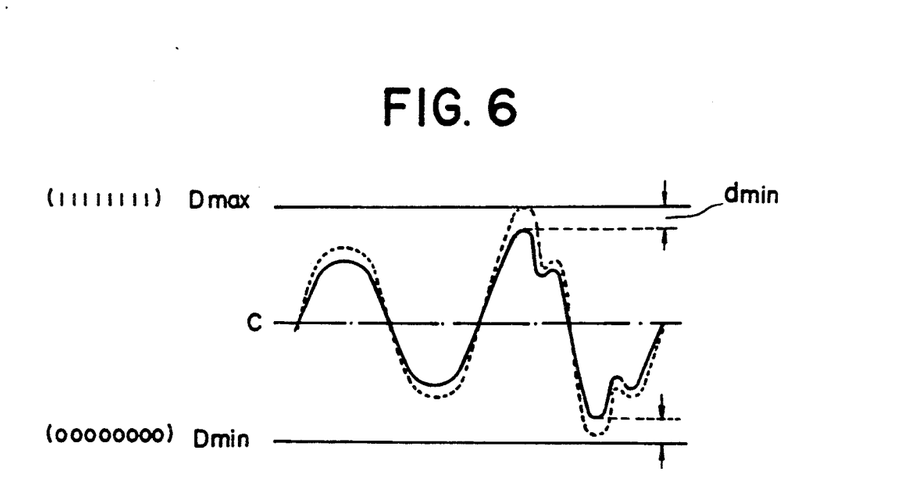
FIG. 6 is a graph representing the operation of detecting color difference signals.

More specifically, in the coefficient-calculating data detection means, the operation is performed in such a manner that, with respect to the color difference signal represented graphically by a solid line in FIG. 6, any data greater than the center value C is compared with the upper limit value $D_{max}$ to obtain the difference therebetween, while any data smaller than the center value C is compared with the lower limit value $D_{min}$ to obtain the difference therebetween, and the minimum difference data $d_{min}$ is used as the coefficient calculating data.

Coefficient setting means 63 sets a proper coefficient value on the basis of the coefficient calculating data $d_{min}$ supplied thereto. As will be described later, the coefficient value is set so that the results of multiplying it by the (R−Y) and (B−Y) data never exceed, in absolute value measured from the center value C, the upper limit value $D_{max}$ or the lower limit value $D_{min}$.

Coefficient limiter means 64 provides as an output a predetermined coefficient value when the set coefficient value is in excess of a certain limit value. Coefficient processing means 66 extends the dynamic range of the color difference data by multiplying the set coefficient value and the (R−Y) and (B−Y) data. Under the control of the control means 67, switching means 65 connects either the coefficient setting means 63 or the coefficient limiter means 64 to the coefficient processing means 66. The multiplication of the coefficient value is executed for extension toward the upper limit value $D_{max}$ with respect to any data greater than the center value C, or toward the lower limit value $D_{min}$ with respect to any data smaller than the center value C.

The operations of such means are controlled individually in response to operation control commands and address data supplied from the control means 67 (through control signal paths indicated by dotted lines). At the time of color saturation control, the control means 67 receives a control execution command from the console 40 and also on/off data therefrom for the coefficient limiter means.

Figure 7:
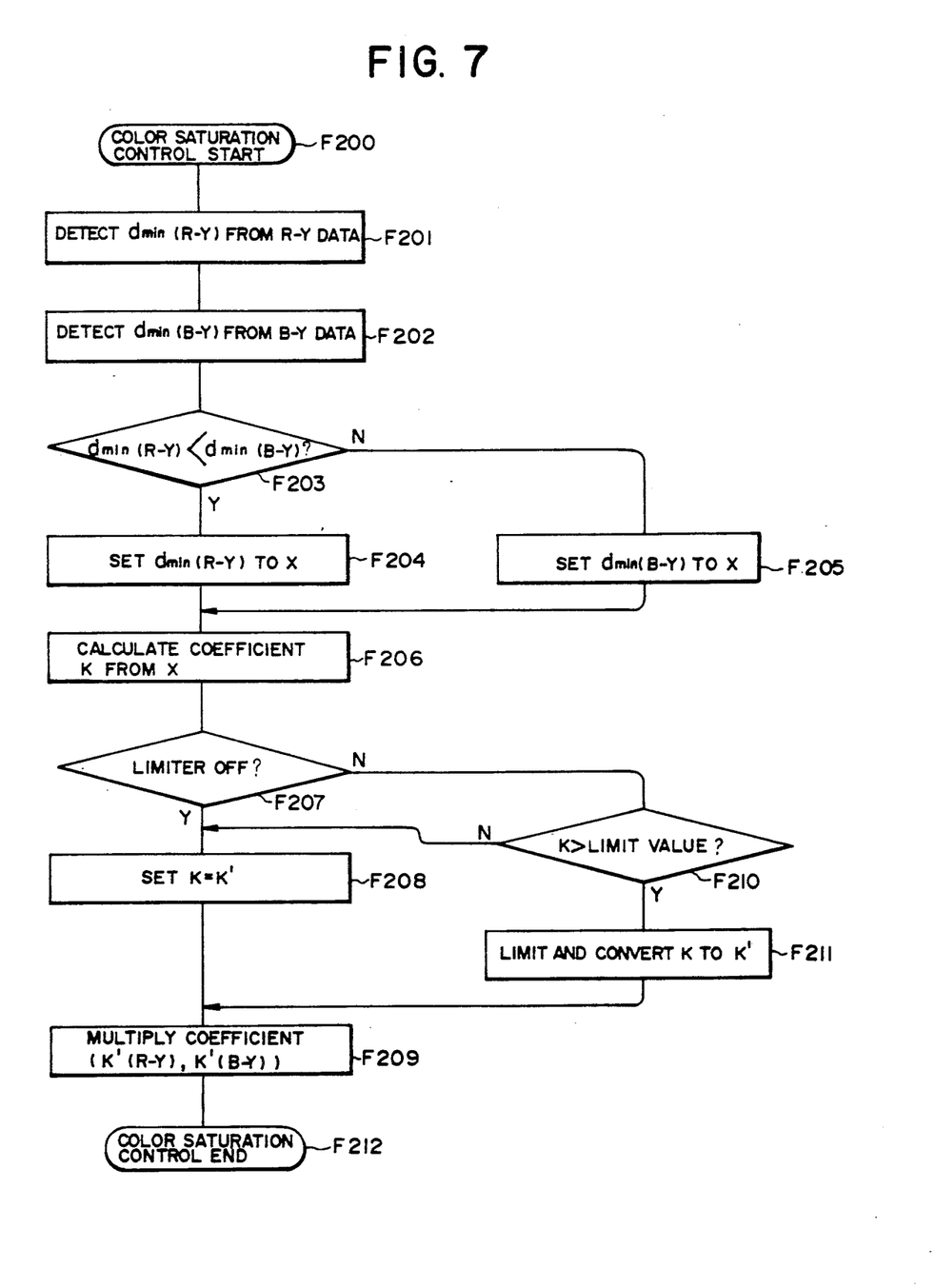
FIG. 7 is a flowchart showing the operations performed in a preferred embodiment of the present invention.

By virtue of the function blocks incorporated in the CPU 33 and described above, automatic color saturation control can be performed with regard to the loaded image data by the control means 67 in accordance with the procedure shown in the flowchart of FIG. 7.

When the color saturation control is started [F200] after the image data is loaded and stored in the image signal memory means 61, the coefficient-calculating data detection means 62 first detects the (R−Y) data to determine the minimum difference data $d_{min}$ (R−Y) as described previously [F201] and then detects the (B−Y) data to determine the difference data $d_{min}$ (B−Y) [F202]. The smaller one of these values is detected [F203] and supplied as coefficient calculating data X to the coefficient setting means 63 [F204, F205].

The coefficient setting means 63 sets a coefficient value K which is capable of extending the dynamic range of the (R−Y) and (B−Y) signals without, however, causing any overflow [F206]. More specifically, there is determined a proper coefficient value K for adjusting the maximum value or minimum value in the color difference data to $D_{max}$ or $D_{min}$. Such coefficient value K can be obtained from the following calculation:

$$K = \frac{\text{Dynamic range}/2}{(\text{Dynamic range}/2) - X}$$

In case the coefficient limiter means 64 is in its off-state, the coefficient value K thus obtained is supplied directly via a contact a of the switching means 65 to the coefficient processing means 66, to thereby multiply the color difference data in each pixel [F207→F208→F209]. As a result of such multiplication, the color difference signal represented by a solid line in FIG. 6 is converted to a signal whose dynamic range is extended as indicated by a dotted line in FIG. 6. In this case, the color difference data multiplied by the coefficient value K never exceeds the value $D_{max}$ and $D_{min}$ as described previously, thus avoiding the partial loss of the color saturation information that would result in case of overflow.

Figure 8A:
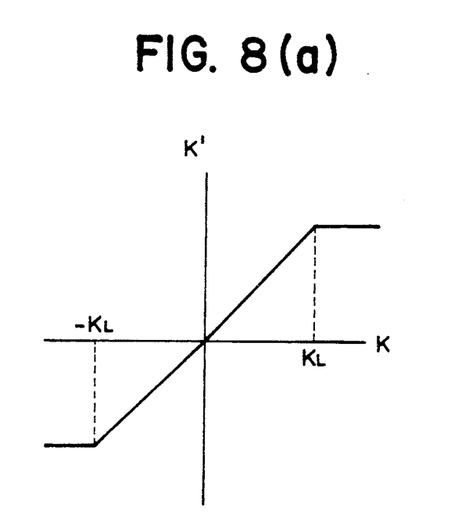
FIGS. 8(a) and 8(b) are graphs representing the operation of a coefficient limiter.
Figure 8B:
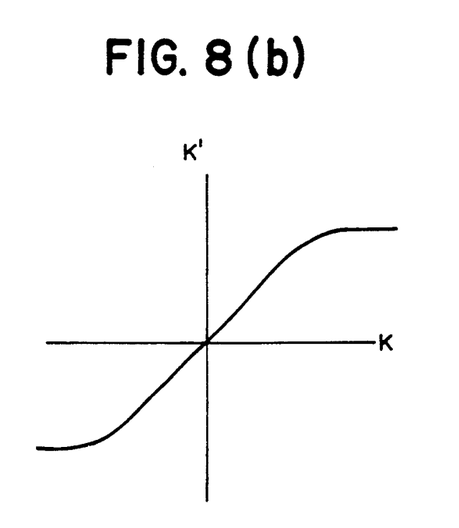

Depending on the image content, it is not necessarily preferred to increase the color saturation by maximally extending the dynamic range. In this embodiment, therefore, the aforementioned coefficient limiter means 64 is additionally provided to limit the coefficient value. More specifically, when the coefficient limiter means 64 is in its on-state, a decision is made in F210 as to whether the set coefficient value K is in excess of a predetermined limit value $K_L$. And if the set coefficient value K is beyond $K_L$ or $-K_L$ as graphically shown in FIG. 8(a), the predetermined coefficient value is supplied to the coefficient processing means 66 [F211]. Such limitation may be effected gradually as shown in FIG. 8(b).

Upon completion of the color saturation control based on extension of the dynamic range of the color difference signals as described above, the procedure advances to F104 in the flowchart of FIG. 4, and after termination of the desired process, the signal is converted into an image signal ready to be printed as mentioned before. Subsequently a printed image is obtained from the printer 50.

The image processing apparatus of this embodiment is constructed so that the dynamic range of the color difference signals is automatically extended within an allowable range, whereby it is unnecessary for an operator to supply as inputs any numerical value or the like, and there is obtainable a complete printed image wherein satisfactory color saturation is maintained. Furthermore, because of the limitation of the coefficient value by the coefficient limiter means, there never occurs an undesired state where the color saturation is increased to such an extent that saturation information is lost.

It is to be understood that the coefficient setting operation is not restricted to the example shown in the flowchart of FIG. 7 and the calculation method mentioned above; any other method may be employed provided that it is adapted to obtain a coefficient suited to convert the color difference signals within the allowable dynamic range.

According to the image processing apparatus of the present invention, as described above, it is possible to control the color saturation data by automatically extending the dynamic range of the color difference signals without changing the color phase. This makes it easy to obtain a print image of proper hue and color saturation.

Many modifications of the preferred embodiments of the invention disclosed above will readily occur to those skilled in the art upon consideration of this disclosure. Accordingly, the embodiments described above are to be taken as merely illustrative, and the invention is limited only by the appended claims.

What is claimed is:

1. Image processing apparatus having a color saturation controller for processing a color image signal to be printed, said apparatus comprising:

input means for providing an incoming color image signal;

color difference means responsive to said input means for deriving color difference signals from said incoming color image signal, said color difference signals having a predetermined allowable dynamic range extending between an upper limit and a lower limit;

detecting means responsive to said color difference means for detecting difference values between said upper limit and a maximum value of said color difference signals and between said lower limit and a minimum value of said color difference signals and for selecting the smaller of said difference values as a minimum difference value between said allowable dynamic range of color difference signals and said derived color difference signals;

coefficient setting means responsive to said detecting means for generating a coefficient value based on said detected minimum difference value; and multiplying means responsive to said coefficient setting means for correcting the levels of said derived color difference signals by multiplying said generated coefficient value and said color difference signals.

2. Image processing apparatus as in claim 1 further comprising coefficient limiter means responsive to said coefficient setting means for placing a limit on said coefficient value obtained from said coefficient setting means, said limit being such that the color saturation is not maximally extended within said allowable dynamic range.

3. Image processing apparatus as in claim 2 further comprising switch means for selectively making said coefficient limiter means effective or ineffective to place said limit on said coefficient value.

4. Image processing apparatus as in claim 1 wherein said color difference signals in said incoming color image signal comprise a signal $(R-Y)$ and a signal $(B-Y)$ and said detecting means detects said minimum difference value for both of said signals $(R-Y)$ and $(B-Y)$.

5. Image processing apparatus as in claim 1 wherein said allowable dynamic range has a center value and values of said color difference signals grater than said center value are compared to said upper limit and values of said color difference signals smaller than said center value are compared to said lower limit in order to determine, respectively, the difference value between said upper limit and said maximum value of said color difference signals and the difference value between said lower limit and said minimum value of said color difference signals.

6. Image processing apparatus as in claim 1 further comprising printer means responsive to said multiplier means for printing a color image.

* * * * *